Feb. 12, 1952  A. E. SCHMIDLIN  2,585,045
TRAP FOR COMPRESSED GAS SYSTEMS
Filed May 8, 1947  2 SHEETS—SHEET 1

INVENTOR.
Albertus E. Schmidlin
BY
Ernest A. Joersen
ATTORNEY

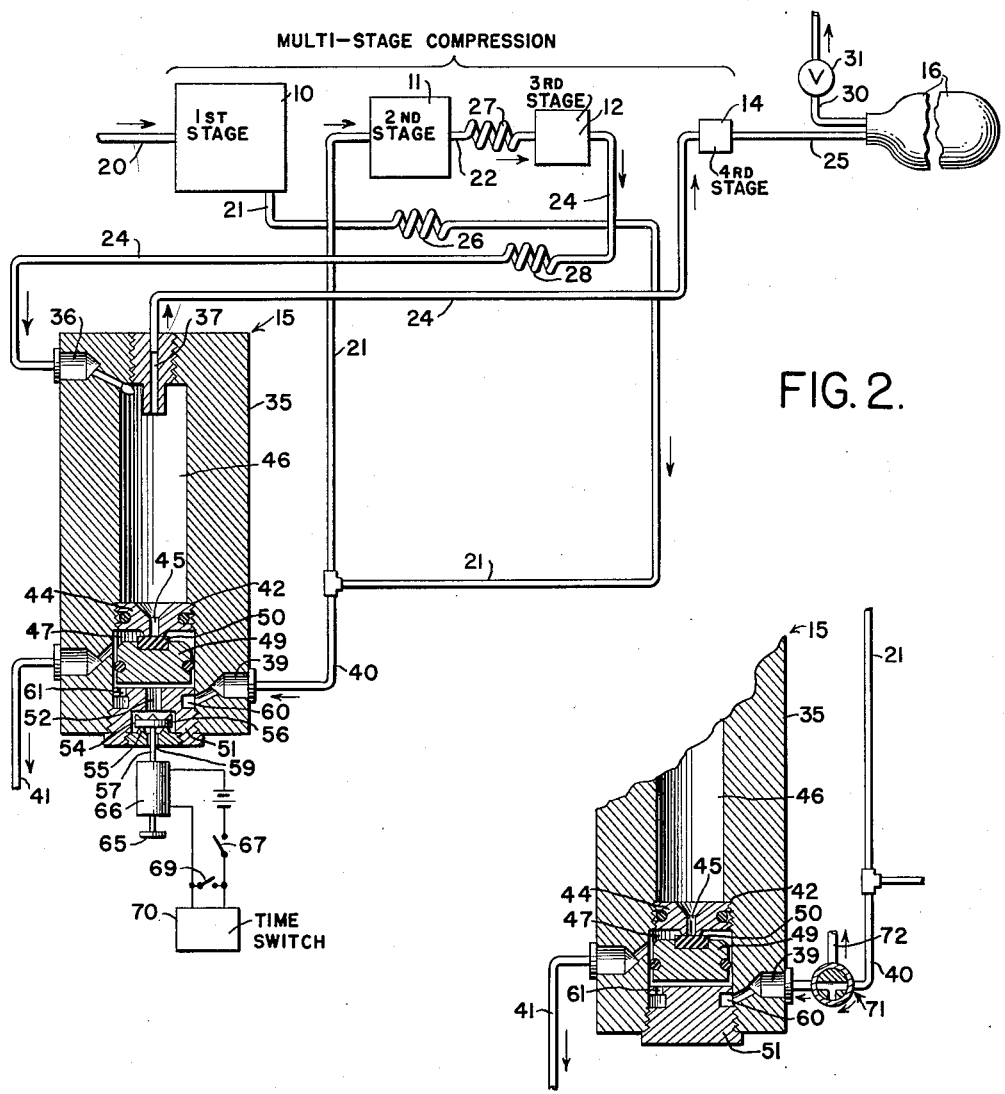

Patented Feb. 12, 1952

2,585,045

UNITED STATES PATENT OFFICE 2,585,045

TRAP FOR COMPRESSED GAS SYSTEMS

Albertus E. Schmidlin, Caldwell, N. J., assignor to Specialties Development Corporation, Belleville, N. J., a corporation of New Jersey Application May 8, 1947, Serial No. 746,830

17 Claims. (Cl. 183—42)

The present invention relates to a compressed gas system, and, more particularly, relates to such systems embodying an improved liquid trap for removing liquid carried by the compressed gas.

An object of the present invention is to provide an improved compressed gas system wherein the liquid collected in the trap is expelled therefrom by a portion of the compressed gas in the system.

Another object is to provide a system of the foregoing character wherein the expulsion of the liquid from the trap is adapted to be controlled by pressure operable means.

Another object is to provide such a system wherein the pressure operable means are actuated in response to the operation of means controlled by pressure of the compressed gas, time switch controlled means, or manual means locally or remotely operable.

A further object is to provide a trap which is light in weight, small in size, compactly arranged, economical to manufacture and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Figure 2 is a schematic view similar to Figure 1 illustrating different control means for the trap connected in the system shown.

Figure 3 is a fragmentary view of the systems shown in Figures 1 and 2 illustrating still different control means for the trap.

Figure 1:
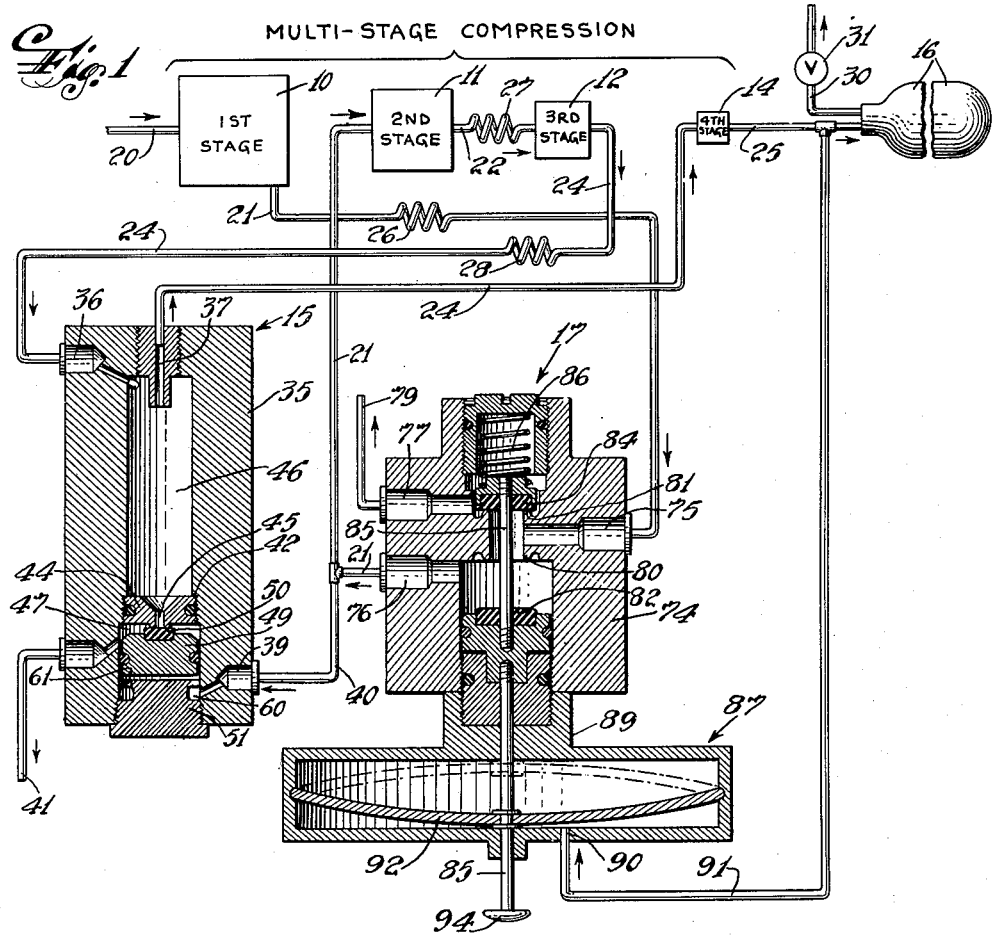
Figure 1 is a schematic view of a compressed gas system illustrating the present invention in connection with a multi-stage compression system.

Referring to Figure 1 of the drawings, there is shown a multi-stage gas compression system having four stages of compression, for example, which may be in a single compressor or may be provided by two or more compressors. The system may be utilized for compressing gas such as air, or the like.

Generally described, the system comprises a first stage 10, a second stage 11, a third stage 12 and a fourth stage, interconnected as about to be described; a trap 15 for removing liquid carried by the gas; a compressed gas receiver, such as a container 16; and control means for the trap described in detail hereinafter.

The system shown takes into consideration that the compression means, represented by the four stages 10, 11, 12 and 14, may be operated constantly over a period of time, whereas the compressed gas will only be used from time to time during such period, whereby more compressed gas is delivered to the receiver 16 than it can safely hold. Hence, valve means 17 are provided for unloading the compression means to by-pass the compressed gas when the gas in the receiver attains a predetermined pressure, and for placing the compression means in pumping relation with respect to the receiver when the pressure of the gas therein drops to a predetermined value. The unloading valve means may be combined with means for controlling the blowing out of the trap, but it is not intended to limit the present invention to this feature.

The first stage 10 has an inlet 20 for receiving atmospheric air, for example, and has an outlet connected by a conduit 21 through the unloading valve means to the inlet of the second stage 11. The second stage has its outlet connected by a conduit 22 to the inlet of the third stage 12, and the third stage has its outlet connected by a conduit 24 through the trap 15 to the inlet of fourth stage 14 which has its outlet connected by a conduit 25 to the receiver 16. Inter-coolers 26, 27 and 28 are provided in the conduits 21, 22 and 24, respectively, for cooling the compressed gas to remove heat of compression and to effect condensation of atmospheric moisture and/or lubricating oil vapors carried by the gas.

The compressed gas in the receiver may be dispensed and conducted to its point of use by a conduit 30 having a valve 31 therein.

The trap 15 comprises a tubular body 35 which is open at its lower end and has a compressed gas inlet 36 and outlet 37 adjacent its upper end, each connected in the conduit 24, and has pressure medium inlet means 39 connected to the conduit 21 by a conduit 40 and has a drainage outlet 41 adjacent its lower end.

The interior of the tubular body is provided with a shoulder 42 for seating a partition member 44 having a drainage port 45 and dividing the interior into an upper separating chamber 46 and a lower valve or piston chamber 47. The gas inlet 36 is tangentially disposed with respect to the chamber 46 to produce a cyclone effect and facilitate separation of oil and/or moisture from the gas. A piston 49 is slidably positioned in the chamber 47 and carries a valve member or sealing disc 50 for controlling the drainage port 45. A closure member or plug 51 is threddedly secured in the open end of the body member below the piston.

The upper end of the plug is in close fitting relation with the walls of the piston or valve chamber 47, and an annular groove 60 is formed just below the upper end which is in fluid flow communication with the pressure medium inlet means 39. Flow restricting means are provided between the groove 60 and the lower end of the chamber 47 in the form of a passage 61 extending through the upper end of the plug from the groove to the chamber.

In operation, compressed gas, such as air, passes through the chamber 46 and liquid carried by the gas is separated therefrom. Pressure medium, which may be a portion of the compressed air being conducted from the first stage to the second stage of compression, is introduced into the chamber 47 beneath the piston 49 by way of the inlet means 39, the groove 60 and the passage 61, whereby the piston normally is effective to hold the valve member 50 in drainage port closing position. When it is desired to blow out the trap, the pressure medium under the piston is vented, whereby the valve member moves away from the port 45 and the pressure of the gas in the chamber 46 blows out the liquid in the trap. This may be accomplished in a number of ways as about to be described.

Venting of the chamber 47 to effect blowing out of the trap may be controlled by means of the unloading valve 17 (Figure 1) as previously mentioned herein. To accomplish this, the valve 17 comprises a body 74 having an inlet 75 and a pair of outlets 76 and 77 in fluid flow communication with the inlet 75. The inlet 75 and outlet 76 are connected in the conduit 21, and the outlet 77 is connected to a conduit 79 in communication with the atmosphere. A downwardly facing valve seat 80 is provided between the inlet 75 and outlet 76 and an upwardly facing valve seat 81 is provided between the inlet 75 and the outlet 77. A valve member 82 is provided for the seat 80 and a valve member 84 is provided for the valve seat 81.

These valve members are connected for simultaneous movement by a stem 85 extending downwardly and outwardly of the valve body. A spring 86 positioned above the valve member 84 serves to normally maintain the valve member 84 on its seat 81 and the valve member 82 off its seat 80. When the valve members are in this position, compressed gas flows through the valve 17 by way of the conduit 21 and the inlet 75 and outlet 76, and a portion of this gas is directed to the chamber 47 of the trap by way of the conduit 40, the valve 71, the inlet means 39, the groove 60 and the passage 61.

In order to effect unloading of the compressor means when the pressure of the gas stored in the receiver 16 attains a predetermined value, pressure operable means 87 are provided for moving the stem 85 to move the valve 82 on its seat and to move the valve member 84 off its seat. When such movement takes place, the compressed gas from the first stage is by-passed to the atmosphere through the valve 17 by way of the inlet 75, the outlet 77 and the conduit 79. Just before the valve member 82 is seated and the valve member 84 is off its seat, the pressure medium in the chamber 47 is sufficiently vented to cause the valve member 49 carried by the piston 50 to unclose the drainage port 45.

As shown herein, the pressure operable means 87 may comprise a housing 89 through which the stem 85 extends having an inlet 90 connected by a conduit 91 to the conduit 25 leading to the receiver 16, and a diaphragm 92 mounted on the stem for moving the same upwardly and downwardly in response to the pressure in the receiver. The diaphragm preferably is of the snap action type adapted to be bulged upwardly, as shown in broken lines, when the underside is subjected to a predetermined pressure and adapted to assume its full line position under the influence of the spring 86 when the pressure acting on the underside thereof drops below a predetermined value.

In order to effect manual operation of the pressure operable means 87, the stem 85 extends outwardly of the housing 89 and carries a button 94 for facilitating manual engagement to move and maintain the stem upwardly, whereby blowing out of the trap takes place. It will be understood that the button 94 could be engaged by electrically or mechanically operated means controlled locally or remotely or by a time switch as previously described.

As illustrated in Figure 2 the valve chamber 47 may be vented in another manner. To accomplish this, the plug 51 has a central bore 52 formed with a valve chamber 54, and a valve seat member 55 is secured in the lower end of the bore 52 for receiving a vent valve member 56 having a stem 57 extending outwardly of the plug through the port 59 of the seat member.

The stem 57 may be provided with manually engageable means such as a button 65 for raising the stem to lift the valve member 56 off its seat, whereby the pressure medium in the chamber 47 is vented by way of the bore 52, the valve chamber 54 and the port 59.

If desired, a solenoid 66 may be provided for raising the valve stem 57. The solenoid may be connected in a circuit including a master switch 67 which is closed while the compressed gas system is in operation, a manually operable switch 69 for controlling the emptying of the trap from a remote location, and a time switch 70 for periodically causing operation of the solenoid to effect venting of the trap. The time switch may be of the clockwork controlled type. Alternatively, this switch may be driven by a stage of compression, and may be constructed and arranged to effect closing of the solenoid circuit after a predetermined number of compression strokes. It will be understood that the time switch of the last mentioned type could be mechanically connected with the stem 57 by means of a cam, a lever, or the like for moving the stem upwardly when predetermined intervals of time have elapsed.

Another way of venting the chamber 47 to effect blowing out of the trap may comprise providing a three-way valve 71 (Figure 3) in the conduit 40. This valve permits the flow of pressure medium through the conduit when in the position shown, and stops the flow of pressure medium and connects the trap side of the conduit 40 to a conduit 72 in communication with the atmosphere by turning the valve ninety degrees in a clockwise direction. The valve 71 is adapted to be manually operated locally or remotely or by a time switch as previously described.

Figure 4:
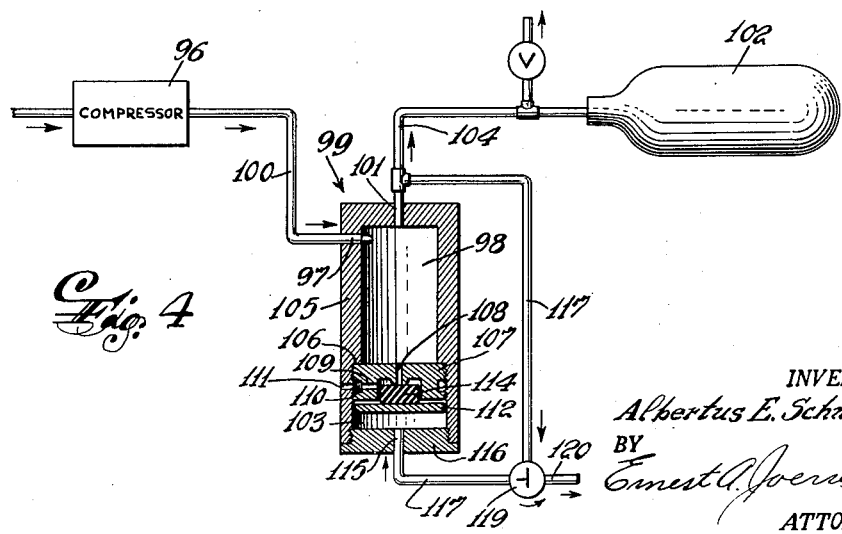
Figure 4 is a schematic view of a compressed gas system illustrating the present invention in connection with a single stage compressor.

Referring to Figure 4, there is shown a compressed gas system having a single stage of compression as exemplified by a compressor 96. The outlet of the compressor is connected to the inlet 97 of a trap 99 by a conduit 100 and the outlet 101 of the trap is connected to a receiver 102 by a conduit 104.

The trap 99, which is illustrated more or less schematically, comprises a tubular body 105 having the inlet 97 and the outlet 101 adjacent the upper end thereof and an open lower end. Between the ends thereof and at the interior, the body is provided with a shoulder 106 for seating a cup-shaped partition member 107 which divides the interior of the body into an upper separating chamber 98 and a lower valve or piston chamber 103. The partition member has a vertical drainage port 108, a lateral passage 109 and an outer annular groove 110 for establishing fluid flow communication between the passage 109 and a drainage outlet 111 in the side wall of the body.

A piston 112 carrying a valve member 114 for controlling the port 108 is positioned in the chamber 103. Pressure medium acting on the underside of the piston is supplied to the chamber through inlet means 115 in a plug 116 secured in the closed lower end of the trap body by a conduit 117 connected to the conduit 104. The piston, as shown, has a greater diameter and area than the valve member. Hence, when both are subjected to substantially equal pressures acting in opposite directions, the effective force on the piston will be greater than that on the valve member, whereby the piston will move the valve member upwardly to close the port 108.

When it is desired to open the port 108, pressure medium in the chamber 103 is vented to the atmosphere by means of a three-way valve 119 in the conduit which is adapted to shut off the flow of pressure medium in the conduit 117 from the conduit 104 and establish communication between the chamber 103 and a conduit 120 leading to the atmosphere. The pressure in the chamber 98 acting on the valve member 114 is then effective to move the latter and the piston carrying it downwardly, whereby liquid entrapped in the chamber 98 flows to the discharge outlet by way of the port 108, the passage 109, and the groove 110.

When it is desired to close the port 108, the valve 119 is returned to the position shown to cause pressure medium to enter the chamber 103 and raise the piston 112 and the valve member 114.

The valve 119 may be actuated by any of the devices previously described herein in connection with the valve 71.

From the foregoing description, it will be seen that the present invention provides an improved compressed gas system wherein liquid collected in a trap is expelled therefrom by compressed gas in the system at desired intervals. Expulsion of the entrapped liquid may be controlled by manually operable means, automatically operable time switch means or by means responsive to loading and unloading of the compressor means.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a compressed gas system, the combination of a compressor; a container for receiving compressed gas; a liquid trap having a compressed gas inlet and outlet and a drainage aperture; pressure medium operable valve means including a valve member for said drainage aperture; conduit means for connecting said compressor to said inlet and said container to said outlet; conduit means connected in fluid flow communication with said first conduit means for supplying compressed gas to said pressure medium operable valve means to cause said valve member to close said drainage aperture; and means for rendering ineffective the supply of compressed gas to said valve means whereby said valve member is caused to open said drainage aperture by pressure in said trap and compressed gas in said trap is effective to expel liquid therefrom through said aperture.

2. In a compressed gas system, the combination of a compressor; a container for receiving compressed gas; a liquid trap having a compressed gas inlet and outlet and a drainage aperture; valve means for opening and closing said drainage aperture including a cylinder and a pressure medium operable valve member in said cylinder for controlling said aperture; conduit means for connecting said compressor to said inlet and said container to said outlet; conduit means establishing fluid flow communication between said first conduit means and said cylinder for supplying compressed gas to cause said valve member to close said aperture; and valve means for venting said cylinder whereby said valve member is rendered ineffective to close said aperture and compressed gas in said trap is effective to expel liquid therefrom through said aperture.

3. In a compressed gas system, the combination of a compressor; a receiver; a liquid trap having a compressed gas inlet and outlet; pressure medium operable drainage means for said trap; conduit means for connecting said compressor to said inlet and said receiver to said outlet; conduit means connected in fluid flow communication with said first conduit means for supplying compressed gas to said pressure operable drainage means to maintain the same in closed position; and means responsive to the pressure of the gas in said receiver for rendering ineffective the supply of compressed gas to said pressure operable drainage means whereby said drainage means are moved into open position and compressed gas in said trap is effective to expel liquid therefrom.

4. In a compressed gas system, the combination of multi-stage compressor means; a liquid trap having a compressed gas inlet and outlet; pressure medium operable drainage means for said trap; conduit means connected to the outlet of one stage of said compressor means for supplying compressed gas to said pressure operable drainage means to maintain the same in closed position; conduit means for conducting compressed gas from the outlet of a subsequent stage of said compressor means to the inlet of said trap; and means for rendering ineffective the supply of compressed gas to said pressure operable drainage means whereby said drainage means are moved into an open position and compressed gas in said trap is effective to expel liquid therefrom.

5. In a compressed gas system, the combination of compressor means having four stages of compression; a receiver; a liquid trap having a compressed gas inlet and outlet; pressure medium operable drainage means for said trap; conduit means connecting the outlet of the first stage of said compressor means to the inlet of the second stage and to said pressure operable drainage means for supplying compressed gas thereto to maintain the same in closed position; a conduit connecting the outlet of the second stage to the inlet of the third stage; conduit means connecting the outlet of the third stage to said inlet of said trap and said outlet of said trap to the inlet of the fourth stage; a conduit for connecting the outlet of the fourth stage to the inlet of said receiver; and means for rendering ineffective the supply of compressed gas to said pressure operable drainage means whereby said drainage means are moved into an open position and compressed gas in said trap is effective to expel liquid therefrom.

6. In a compressed gas system, the combination of compressor means having four stages of compression; a receiver; a liquid trap having a compressed gas inlet and outlet; pressure medium operable drainage means for said trap; conduit means connecting the outlet of the first stage of said compressor means to the inlet of the second stage and to said pressure operable drainage means for supplying compressed gas thereto to maintain the same in closed position; a conduit connecting the outlet of the second stage to the inlet of the third stage; conduit means connecting the outlet of the third stage to said inlet of said trap and said outlet of said trap to the inlet of the fourth stage; a conduit for connecting the outlet of the fourth stage to the inlet of said receiver; and means in said first mentioned conduit means responsive to the pressure of gas in said receiver for rendering ineffective the supply of compressed gas to said pressure operable drainage means whereby said drainage means are moved into an open position and compressed gas in said trap is effective to expel liquid therefrom.

7. In a compressed gas system, the combination of compressor means having four stages of compression; a receiver; a liquid trap having a compressed gas inlet and outlet; pressure medium operable drainage means for said trap; conduit means connecting the outlet of the first stage of said compressor means to the inlet of the second stage and to said pressure operable drainage means for supplying compressed gas thereto to maintain the same in closed position; a conduit connecting the outlet of the second stage to the inlet of the third stage; conduit means connecting the outlet of the third stage to said inlet of said trap and said outlet of said trap to the inlet of the fourth stage; a conduit for connecting the outlet of the fourth stage to the inlet of said receiver; and a valve device in said first mentioned conduit means responsive to the pressure of gas in said receiver for rendering ineffective the supply of compressed gas to said pressure operable drainage means whereby said drainage means are moved into an open position and compressed gas in said trap is effective to expel liquid therefrom, said valve device being constructed and arranged to normally supply compressed gas to the second stage of said compressor and to said pressure operable drainage means, and having valve means for shutting off said supply and by-passing the compressed gas to the atmosphere.

8. In a compressed gas system, the combination of multi-stage compressor means; a liquid trap having a compressed gas inlet and outlet; pressure medium operable drainage means for said trap; conduit means connected to the outlet of one stage of said compressor means for supplying compressed gas to said pressure operable drainage means to maintain the same in closed position; conduit means for conducting compressed gas from the outlet of a subsequent stage of said compressor means to the inlet of said trap; and a valve device for rendering ineffective the supply of compressed gas to said pressure operable drainage means whereby said drainage means are moved into an open position and compressed gas in said trap is effective to expel liquid therefrom, said valve device being constructed and arranged to normally supply gas from said first mentioned stage to a subsequent stage of said compressor means and to said pressure operable drainage means, and having valve means for shutting off said supply and by-passing the same.

9. In a compressed gas system, the combination of a compressor; a receiver; a liquid trap having a compressed gas inlet and outlet; pressure medium operable drainage means for said trap; conduit means for connecting said compressor to said inlet and said receiver to said outlet; conduit means connected in fluid flow communication with said first conduit means for supplying compressed gas to said pressure operable drainage means to maintain the same in closed position; and means for rendering ineffective the supply of compressed gas to said pressure operable drainage means whereby said drainage means are moved into open position and compressed gas in said trap is effective to expel liquid therefrom, said last mentioned means including a timing device for rendering the same effective at predetermined intervals.

10. In a compressed gas system, the combination of a compressor; a receiver; a liquid trap having a compressed gas inlet and outlet; pressure medium operable drainage means for said trap; conduit means for connecting said compressor to said inlet and said receiver to said outlet; conduit means connected in fluid flow communication with said first conduit means for supplying compressed gas to said pressure operable drainage means to maintain the same in closed position; and manually operable means for rendering ineffective the supply of compressed gas to said pressure operable drainage means whereby said drainage means are moved into open position and compressed gas in said trap is effective to expel liquid therefrom.

11. A liquid trap for compressed gas systems comprising a hollow body having an inlet and outlet at one end for compresed gas carrying liquid to be trapped and having outlet means at the opposite end, a partition in said body between the ends thereof having a port for draining trapped liquid and providing a separating chamber between it and the end having said inlet and outlet and a valve chamber between it and the end having said outlet means, pressure operable valve means in said valve chamber for controlling said port, said valve chamber having pressure medium inlet means between said valve means and said outlet means and having a drainage outlet between said valve means and said partition, and vent valve means for said outlet means.

12. A liquid trap for compressed gas systems comprising a hollow body having an inlet and outlet adjacent the upper end thereof for compressed gas carrying liquid to be trapped and having outlet means at the lower end thereof, a partition in said body between the ends thereof having a port for draining trapped liquid and providing a separating chamber between it and the upper end and a valve chamber between it and the lower end, a piston in said valve chamber carrying a valve member for controlling said port, said valve chamber having pressure medium inlet means between said piston and said outlet means and having a drainage outlet between said piston and said partition, and vent valve means for said outlet means.

13. A liquid trap for compressed gas systems comprising a hollow body having an inlet and outlet at one end for compressed gas carrying liquid to be trapped and having outlet means at the opposite end, a partition in said body between the ends thereof having a port for draining trapped liquid and providing a separating chamber between it and the end having said inlet and outlet and a valve chamber between it and the end having said outlet means, pressure operable valve means in said valve chamber for controlling said port, said valve chamber having pressure medium inlet means between said valve means and said outlet means and haing a drainage outlet between said valve means and said partition, vent valve means for said outlet means and flow restricting passage means between inlet means and said valve chamber.

14. A liquid trap for compressed gas systems comprising a tubular body having an inlet and outlet adjacent its upper end for compressed gas carrying liquid to be trapped and having an opening in its lower end, a closure member for said opening having outlet means therein, a partition in said body between the ends thereof providing a separating chamber in the upper portion of said body and a valve chamber in the lower portion of said body and having a port therein for draining trapped liquid from said separating chamber, a piston in said valve chamber carrying a valve member for controlling said port, said valve chamber having pressure medium inlet means between said piston and said closure member and having a drainage outlet between said piston and said partition, and vent valve means for said outlet means, said closure member having a flow restricting passage between inlet means and the lower end of said valve chamber.

15. In a compressed gas system, the combination of a compressor, a receiver, conduit means for delivering compressed gas from said compressor to said receiver, means associated with said conduit means between said compressor and said receiver for by-passing the compressed gas to prevent its delivery to said receiver including a normally closed valve, a liquid trap having a gas inlet and a gas outlet connected in said conduit means between said receiver and said by-pass means and having a liquid outlet, drainage means for said liquid outlet including a normally closed valve, and means operated by the compressed gas in said conduit means for simultaneously opening said by-pass means valve and said drainage means valve.

16. In a compressed gas system, the combination of a compressor; a receiver; a liquid trap having a compressed gas inlet and outlet; pressure medium operable drainage means for said trap including a normally closed valve; conduit means for connecting said compressor to said inlet and said receiver to said outlet; conduit means connected in fluid flow communication with said first conduit means for supplying compressed gas to said pressure operable drainage means to maintain said valve in closed position; and means in said second conduit for controlling the flow of compressed gas therethrough to effect operation of said pressure medium operable means to open said valve whereby compressed gas in said trap is effective to expel liquid therefrom.

17. In a compressed gas system, the combination of a compressor; a receiver; a liquid trap having a chamber provided with a compressed gas inlet and outlet and a drainage aperture; conduit means connecting said compressor to said trap inlet and said receiver to said trap outlet whereby compressed gas is conducted through said trap chamber; a valve member adjacent the outlet side of said drainage aperture; means for positioning said valve member to seal said aperture in opposition to the pressure of the gas in said chamber including a piston and a cylinder for said piston having an inlet and having a drainage discharge outlet adapted to be placed in fluid flow communication with said drainage aperture; conduit means establishing fluid flow communication between said first conduit means and said cylinder for supplying compressed gas to said cylinder to cause said piston to position said valve member to seal said drainage aperture; and vent valve means for rendering the supply of compressed gas to said cylinder ineffective to maintain said piston in the position to cause said valve member to seal said drainage aperture whereby said valve member is caused to open said drainage aperture by pressure in said trap chamber and the compressed gas in said chamber is effective to expel liquid therefrom through said drainage aperture.

ALBERTUS E. SCHMIDLIN.

REFERENCES CITED

The following references are of record in the file of this patent:

UNITED STATES PATENTS

| Number | Name | Date |
|---|---|---|
| 1,450,561 | Parker | Apr. 3, 1923 |
| 1,691,630 | Ludeman | Nov. 13, 1928 |
| 1,871,546 | McClafferty | Aug. 16, 1932 |
| 1,937,855 | Stuard | Dec. 5, 1933 |
| 2,339,469 | Emanual | Jan. 18, 1944 |
| 2,348,357 | Parks | May 9, 1944 |
| 2,361,393 | Freeman et al. | Oct. 31, 1944 |
| 2,406,214 | Garnier | Aug. 20, 1946 |